(12) United States Patent
Mizutani

(10) Patent No.: US 6,172,686 B1
(45) Date of Patent: Jan. 9, 2001

(54) GRAPHIC PROCESSOR AND METHOD FOR DISPLAYING A PLURALITY OF FIGURES IN MOTION WITH THREE DIMENSIONAL OVERLAY

(75) Inventor: Kenichi Mizutani, Kanagawa (JP)

(73) Assignee: NEC Corporation, Tokyo (JP)

( * ) Notice: Under 35 U.S.C. 154(b), the term of this patent shall be extended for 0 days.

(21) Appl. No.: 09/103,832

(22) Filed: Jun. 24, 1998

(30) Foreign Application Priority Data

Jun. 26, 1997 (JP) .................................. 9-169749

(51) Int. Cl.[7] .................................. G06F 12/06
(52) U.S. Cl. .................. 345/515; 345/213; 345/523; 345/521; 345/501
(58) Field of Search .................. 345/213, 501, 345/196, 515, 523–525, 507–509, 521

(56) References Cited

U.S. PATENT DOCUMENTS

| | | | |
|---|---|---|---|
| 4,303,986 | 12/1981 | Lans | 345/501 |
| 4,823,119 | * 4/1989 | Ishii | 345/188 |
| 5,444,845 | * 8/1995 | Cho | 395/524 |
| 5,557,302 | 9/1996 | Levinthal et al. | 345/509 |
| 5,680,175 | * 10/1997 | Yanai et al. | 348/441 |
| 5,696,540 | * 12/1997 | Katsura et al. | 345/213 |
| 6,037,953 | * 3/2000 | Mizutani | 345/523 |

FOREIGN PATENT DOCUMENTS 0 352 012   1/1990 (EP) .................. G09G/1/00

* cited by examiner

Primary Examiner—Kee M. Tung
(74) Attorney, Agent, or Firm—Scully, Scott, Murphy & Presser

(57) ABSTRACT

A graphic processor comprises a timing generator to output the signal for operation timing control according to the clock signal, the vertical sync signal and the horizontal sync signal, a drawing processor to output the graphic data of the object figures, a selection section to output the display buffer address signal under the control of the timing generator, a display buffer to which the graphic data output from the drawing processor is input and which outputs the display data signal under the control of the timing generator, a mask section to mask the display data signal output from the display buffer as required and a status register to control the mask section according to the display buffer address signal.

8 Claims, 10 Drawing Sheets

GRAPHIC PROCESSOR AND METHOD FOR DISPLAYING A PLURALITY OF FIGURES IN MOTION WITH THREE DIMENSIONAL OVERLAY

BACKGROUNDS OF THE INVENTION

1. Field of the Invention

The present invention relates to a graphic processor and a graphic processing method to process figures to be displayed on a display unit by use of a microcomputer, and particularly relates to a graphic processor and a graphic processing method suitable for a system to rapidly display a plurality of figures in motion with three-dimensionally overlaying them.

2. Description of the Related Art

Recently, various special functions are required for pictures displayed on a graphic display unit so as to improve the effect appealing to the viewers' perception. One of such special functions is the stereoscopic display. It is an expression technique to display a three-dimensional scene with a depth having a plurality of mutually overlaid figures (sprites) in rapid motion and change on the screen of a graphic display unit.

Referring to FIGS. 4, 5 and 6, a conventional graphic processor and a graphic processing method used for stereographic display are described below. FIG. 4 shows a stereoscopic display screen displaying a first figure G1 comprising 4*4 pixels at the coordinates (40, m) and a second different figure G2 comprising 4*4 pixels at the coordinates (42, n) on the first line of a display screen SC1 with the second figure G2 displayed in front of the first figure G1. FIG. 5 is a block diagram illustrating the configuration of a graphic processor and the signal flow and FIG. 6 is a timing chart of the signal waveforms when the figures in FIG. 4 are displayed.

As shown in FIG. 5, a conventional graphic processor 20 comprises a drawing processor 21, a timing generator 22 and a display buffer 23 and outputs the graphic display data to a display 24 as a graphic display unit. The timing generator 22 has input of the clock signal (S1), the vertical sync signal (S3) and the horizontal sync signal (S2) and outputs the drawing processor control signal (S4), the display initialize signal (S8) and the drawing display switching signal (S11). The drawing processor 21 incorporates a storage to store the original data of the displayed figure. It receives the input of the clock signal (S1), the drawing processor control signal (S4) and the display initialize signal (S8) for certain drawing processing and outputs graphic data comprising the drawing graphic data signal (S5), the display buffer write enable signal (S6) and the display buffer drawing address signal (S7). The display buffer 23 temporarily stores the graphic data and outputs the graphic display data to the display 24 in response to input of the drawing display switching signal (S11).

Next, referring to FIG. 6, the operation of the graphic processor 20 when displaying the first line as shown in FIG. 4 is described below.

Firstly, at the same time as the activation of the graphic processor 20, the vertical sync signal (S2) is input from the main system (not shown) to the graphic processor 20 and the timing generator 22 is initialized. Note that rewriting of the whole contents in the display buffer to the graphic data to display the same color as the screen background color (i.e. no display on the screen) is referred to as the display initialization in the description below. The graphic data to display the same color as the screen background color is called the transparent data. In other words, the transparent data is the graphic data of the same color as that of the screen background so that it causes nothing to be displayed on the screen. The background color is usually specified by the user.

Next, prior to the operation to display figures on the screen updated periodically, the graphic processor 20 is initialized for every update of the screen. For this, once for every update of the screen, the horizontal sync signal (S3) is input from the main system (not shown) to the timing generator 22. Upon input of the horizontal sync signal (S3), the drawing processor control signal (S4), the display initialize signal (S8) and the drawing display switching signal (S11) are output from the timing generator 22.

The drawing processor 21 is initialized by the display initialize signal (S8) and then the display buffer 23 is initialized by the display initialize signal from the drawing processor 21. These processes bring the graphic processor 20 to the drawing start status.

Referring to FIG. 6, initialization of the graphic processor 20 starts when the drawing display switching signal (S11) reaches the low level (hereinafter indicated as "0" (L)) and is executed while the display initialize signal (S8) is at "0" (L). Corresponding to the display buffer drawing address signal (S7)="0" to "n" (number of display buffers), transparent data is provided as the drawing graphic data signal (S5). Meanwhile, in response to the display buffer drawing address signal (S7), the display buffer write enable signal (S6) becomes "0" (L). Thus, by replacing the data at the addresses used for display in the display buffer 23 entirely with transparent data, initialization of the display buffer 23 is completed.

Upon completion of initialization of the display buffer 23, the display initialize signal (S8) rises to the high level (hereinafter indicated as "1" (H)) and terminates the initialization process of the graphic processor 20. Then, the graphic processor 20 is in the drawing start status, where graphic data can be stored to the display buffer 23.

The drawing processor 21 firstly displays the figure G1 with a low display priority as shown in FIG. 4. For this, it serially outputs, as the graphic data, the display buffer drawing address signal (S7)="40" to "43" (h) and the corresponding drawing graphic data signal (S5) for every clock signal (S1). During this period, corresponding to the display buffer drawing address signal (S7), the display buffer write enable signal (S6) becomes "0" (L) and the drawing graphic data signal (S5), the display buffer write enable signal (S6) and the display buffer drawing address signal (S7) are stored to the display buffer 23 as the graphic data of the figure G1.

Then, the drawing processor 21 displays the figure G2 as shown in FIG. 4. For this, it serially outputs, as the graphic data, the display buffer drawing address signal (S7)="42" to "45" (h) and the corresponding drawing graphic data signal (S5) for every clock signal (S1). During this period, corresponding to the display buffer drawing address signal (S7), the display buffer write enable signal (S6) becomes "0" (L) and the drawing graphic data signal (S5), the display buffer write enable signal (S6) and the display buffer drawing address signal (S7) are stored to the display buffer 23 as the graphic data of the figure G2.

Upon completion of operation to store the graphic data for drawing to the display buffer 23, the drawing display switching signal (S11) becomes "1" (H) and the graphic processor 20 moves to the graphic display status. Then, the graphic processor 20 reads out the graphic data from the display buffer 23 and starts its output as the graphic display data signal. After moving to the graphic display status, the drawing processor 21 provides the display buffer 23 with the display buffer drawing address signal (S7)="0" to "n". Thus, the corresponding display data signal (S9) is taken out from the display buffer 23 and output to the display 24. By these processes above, the figures G1 and G2 are displayed on the display screen as shown in FIG. 4.

Then, referring to FIGS. 4, 7, 8 and 9, another example of the conventional graphic processor is described below. FIG. 7 is a block diagram to illustrate the configuration of a graphic processor and the signal flow, FIG. 8 is a block diagram to show the configuration of a status register and FIG. 9 is a timing chart of the signal waveforms when the figures in FIG. 4 are displayed.

As shown in FIG. 7, a graphic processor 30 is provided with, in addition to the drawing processor 21, the timing generator 22 and the display buffer 23, a status register 31 to determine the display priority and output the mask signal (S13) when storing the display data to the display buffer 23 and a mask section 32 which, in response to the mask signal (S13), masks the display buffer write enable signal (S6) and outputs the post-masking display buffer write enable signal (S15).

Next, referring to FIG. 9, the operation of the graphic processor 30 when displaying the first line in FIG. 4 is described.

Firstly, at the same time as the activation of the graphic processor 30, the vertical sync signal (S2) is input from the main system (not shown) to the graphic processor 30 and the timing generator 22 is initialized. Then, the horizontal sync signal (S3) is once input from the main system (not shown) to the timing generator 22. Upon input of the horizontal sync signal (S3), the drawing processor control signal (S4), the display initialize signal (S8) and the drawing display switching signal (S11) are output from the timing generator 22. The drawing processor 21 is initialized by the display initialize signal (S8) and then the display buffer 23 is initialized by the display initialize signal from the drawing processor 21.

Referring to FIG. 9, initialization of the graphic processor 30 starts when the drawing display switching signal (S11) reaches "0" (L) and is executed while the display initialize signal (S8) is at "0" (L). Corresponding to the display buffer drawing address signal (S7)="0" to "n" (number of display buffers), transparent data is provided as the drawing graphic data signal (S5). Meanwhile, in response to the display buffer drawing address signal (S7), the display buffer write enable signal (S6) becomes "0" (L). Thus, by replacing the data at the addresses used for display in the display buffer 23 entirely with transparent data, initialization of the display buffer 23 is completed. The status register 31 is also initialized by the display initialize signal (S8) from the timing generator 22.

Upon completion of initialization of the display buffer 23, the display initialize signal (S8) rises to "1" (H)) and terminates the initialization process of the graphic processor 30, which enters the drawing start status.

The status register 31 is, as shown in FIG. 8, provided with an encoder 311, two-input OR gates 312 for the same number of addresses as that of the display buffer 23, two-input AND gates 313 for the same number of addresses as that of the display buffer 23, registers 314 for the same number of addresses as that of the display buffer 23 and a selector 315 to select one of the signals output from the register B11.

With the above configuration, the status register 31 has its all addresses in the register 314 reset during initialization and has the data corresponding to the accessed arbitrary addresses in the register 314 set during operation other than initialization. The register 314 is set by input of "1" (H) signal and reset by input of "0" (L) signal.

Firstly, the drawing processor 21 serially outputs, as the graphic data to draw the figure G2 shown in FIG. 4, the display buffer drawing address signal (S7)="42" to "45" (h) and corresponding drawing graphic data signal (S5) for every clock signal (S1). During this period, corresponding to the display buffer drawing address signal (S7), the display buffer write enable signal (S6) becomes "0" (L).

The status register 31 outputs, upon receipt of the display buffer drawing address signal (S7)="42" to "45" (h), the mask signal (S13)="0" (L) for this period. Its internal status is set so that "1" (H) is output as the mask signal (S13) when the display buffer drawing address signal (S7)="42" to "45" (h) is input for the next time.

The mask section 32 masks the display buffer write enable signal (S6) when the mask signal (S13)="1" (H) and does not mask the display buffer write enable signal (S6) when the mask signal (S13)="0" (L) for output. In other words, when the mask signal (S13)="0" (L) is received, the display buffer write enable signal (S6) is output without any change as the post-masking display buffer write enable signal (S15). The display buffer 23 stores, as the graphic data of the figure G2, the drawing graphic data signal (S5), the display buffer drawing address signal (S7) and the post-masking display buffer write enable signal (S15).

Subsequently, the drawing processor 21 serially outputs, as the graphic data to draw the figure G1 as shown in FIG. 4, the display buffer drawing address signal (S7)="40" to "43" (h) and the corresponding drawing graphic data signal (S5) for every clock signal (S1). During this period, the display buffer write enable signal (S6) becomes "0" (L) corresponding to the display buffer drawing address signal (S7).

As described above, the status register 31 has its internal status set so that it outputs the mask signal (S13)="0" (L) upon input of the display buffer drawing address signal (S7)="40" to "41" (h) and outputs "1" (H) upon input of the display buffer drawing address signal (S7)="42" to "43" (h). Thus, upon receipt of the display buffer drawing address signal (S7)="40" to "43" (h), the status register 31 outputs the mask signal (S13)="0" (L) while the display buffer drawing address signal (S7)="40" to "41" and outputs the mask signal (S13)="1" (H) while the display buffer drawing address signal (S7)="42" to "43".

While the display buffer drawing address signal (S7)="40" to "41", the mask section 32 accepts the mask signal (S13)="0" (L) and outputs the display buffer write enable signal (S6) without any change as the post-masking display buffer write enable signal (S15). While the display buffer drawing address signal (S7)="42" to "43", it receives the mask signal (S13)="1" (H), masks the display buffer write enable signal (S6) and outputs the post-masking display buffer write enable signal (S15)="1" (H). The display buffer 23 stores, as the graphic data of the figure G1, the drawing graphic data signal (S5), the display buffer drawing address signal (S7), and the post-masking display buffer write enable signal (S15).

Upon completion of operation to store the graphic data for drawing to the display buffer 23, the drawing display switching signal (S11) becomes "1" (H) and the graphic processor 30 moves to the graphic display status. Then, the drawing processor 21 provides the display buffer 23 with the display buffer drawing address signal (S7)="0" to "n". Thus, the corresponding display data signal (S9) is taken out from the display buffer 23 and output to the display 24. By these processes above, the figures G1 and G2 are displayed on the display screen as shown in FIG. 4.

Referring to FIG. 10 now, the reason why the display initialization is required for every update of the screen in operation of the graphic processor is explained.

Suppose, for example, a screen SC2 containing a figure G3 is displayed on the display screen of the display 24 as shown in FIG. 10(a). When the screen SC2 is updated and the screen SC3 containing a figure G4 as shown in FIG. 10(b) is displayed, display of the figure G4 immediately after the status of screen SC2 causes the figure G3 on the previous screen SC2 to be displayed in the area without any data on the screen SC3 as shown in FIG. 10(c).

To prevent such situation in update of the screen SC2, the contents of the display buffer are entirely replaced with graphic data for no display or transparent data by the display initialization process before display of the screen SC3. Thus, as shown in FIG. 10(b), the figure G4 only can be properly displayed on the screen SC3.

The conventional graphic processor as described above writes transparent data to the display buffer during display initialization. Graphic data cannot be stored to the display buffer during this process, which results in a lower throughput and graphic display capacity of the graphic processor. However, it was not considered as a drawback because the time required for display initialization was short in conventional systems.

Recently, improved resolution of display increases the amount of graphic data to be displayed on the screen and results in a longer time required for display initialization. For this reason, deterioration of the throughput and graphic display capacity of the graphic processor becomes too grave to ignore.

Further, only a small number of figures were displayed and the user had enough time to execute graphic processing after display initialization before. At present, displayed figures become complicated and sophisticated with the progress in display resolution and the time for graphic processing becomes insufficient.

SUMMARY OF THE INVENTION

An object of the present invention is to provide a graphic processor and a graphic processing method which can sufficiently support a display unit with a high resolution with an improved throughput achieved by reduction of the time required for display initialization.

According to the first aspect of the invention, a graphic processor for drawing several overlaid graphic data having a positional relation in the depth direction on a single display screen of a display unit, comprises timing generation means for outputting a drawing processing control signal, a display initialize signal, a display address signal and a drawing display switching signal for control of the operation timing according to a clock signal, a vertical sync signal and a horizontal sync signal, drawing processing means which incorporates a storage storing the original data of the displayed figures and, under the control of said clock signal and said drawing processing control signal, for outputting a drawing graphic data signal, a display buffer write enable signal and a display buffer drawing address signal of the object figures as graphic data, selection means, under the control of said drawing display switching signal output from said timing generation means, for selecting either said display buffer drawing address signal output from said drawing processing means or said display address signal output from said timing generation means and outputting the selected signal as a display buffer address signal, display buffer means for inputting said clock signal, said drawing graphic data signal and said display buffer write enable signal and said display buffer address signal and, according to said clock signal and said display buffer address signal, outputting the display data signal, status register means for inputting said clock signal, said display initialize signal and said display buffer address signal and, being reset under control of said display initialize signal and outputting a mask signal corresponding to said display buffer address signal, and mask means for inputting said display data signal and said mask signal output from said status register means and, under the control of said mask signal, outputting a post-masking display data signal with providing necessary masks to said display data signal to said display unit.

In the preferred construction, said status register means outputs said mask signal having two values, and said mask means outputs as the post-masking display data signal the graphic data to display the same color as the background of the screen obtained by masking said display data signal when one of said two values of the mask signal is input and outputs as the post-masking display data signal said display data signal without any change when the other one of said two values of the mask signal is input.

In the preferred construction, said display buffer means without being initialized receives input of said drawing graphic data signal and said display buffer write enable signal and said display buffer address signal for the picture after update and outputs said display data signal in the process to update the picture to be displayed on said display unit, and said mask means is controlled by said mask signal and masks said display data signal corresponding to the position where no figure is to be displayed in the picture after said update.

In another preferred construction, said display buffer means without being initialized receives input of said drawing graphic data signal, said display buffer write enable signal and said display buffer address signal for the picture after update and outputs said display data signal in the process to update the picture to be displayed on said display unit, said status register means outputs said mask signal which has two values so that one of them corresponds to a position where no figure is to be displayed in the picture after said update and the other corresponds to a position where a figure is displayed in the picture after said update, and said mask means outputs as the post-masking display data signal the graphic data to display the same color as the background of the screen obtained by masking said display data signal when said one of the values of said mask signal is input and outputs as the post-masking display data signal said display data signal without any change when the other value of said mask signal is input.

According to the second aspect of the invention, a graphic processing method to draw a plurality of graphic data having a positional relation in the depth direction on a single display screen of a display unit with overlaying a plurality of graphic data, comprising the steps of a step of outputting a drawing graphic data signal, a display buffer write enable signal and a display buffer drawing address signal of the object figures as a graphic data from the drawing processing means incorporating a storage storing a original data of displayed figures, a step of storing said drawing graphic data signal, said display buffer write enable signal and said display buffer drawing address signal to a display buffer means, a step of selecting either said display buffer drawing address signal output from said drawing processing means or the display address signal output from said timing generation means according to the drawing display switching signal output from the timing generation means for operation timing control, a step of storing selected signal as a display buffer address signal to the status register means, a step of reading the display data from said display buffer means, and outputting either said display data without any change or said display data with masking for conversion to the graphic data to display the same color as screen background color according to information stored in said status register means, after the output of the graphic data from said drawing processing means for the drawn figure to be finally displayed on said display unit.

In the preferred construction, the graphic processing method further comprises a step of inputting a vertical sync signal for initialization of said timing generation means before output of said graphic data from said drawing processing means, and a step of inputting a horizontal sync signal and initializing said drawing processing means and said status register means after initialization of said timing generation means.

According to another aspect of the invention, a computer readable memory storing a control program for controlling a graphic processor to draw several overlaid graphic data with positional relation in the depth direction on a single display screen of a display unit, said control program comprising the steps of a step of outputting a drawing graphic data signal, a display buffer write enable signal and a display buffer drawing address signal of the object figures as a graphic data from the drawing processing means incorporating a storage storing a original data of displayed figures, a step of storing said drawing graphic data signal, said display buffer write enable signal and said display buffer drawing address signal to a display buffer means, a step of selecting either said display buffer drawing address signal output from said drawing processing means or the display address signal output from said timing generation means according to the drawing display switching signal output from the timing generation means for operation timing control, a step of storing selected signal as a display buffer address signal to the status register means, a step of reading the display data from said display buffer means, and outputting either said display data without any change or said display data with masking for conversion to the graphic data to display the same color as screen background color according to information stored in said status register means, after the output of the graphic data from said drawing processing means for the drawn figure to be finally displayed on said display unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
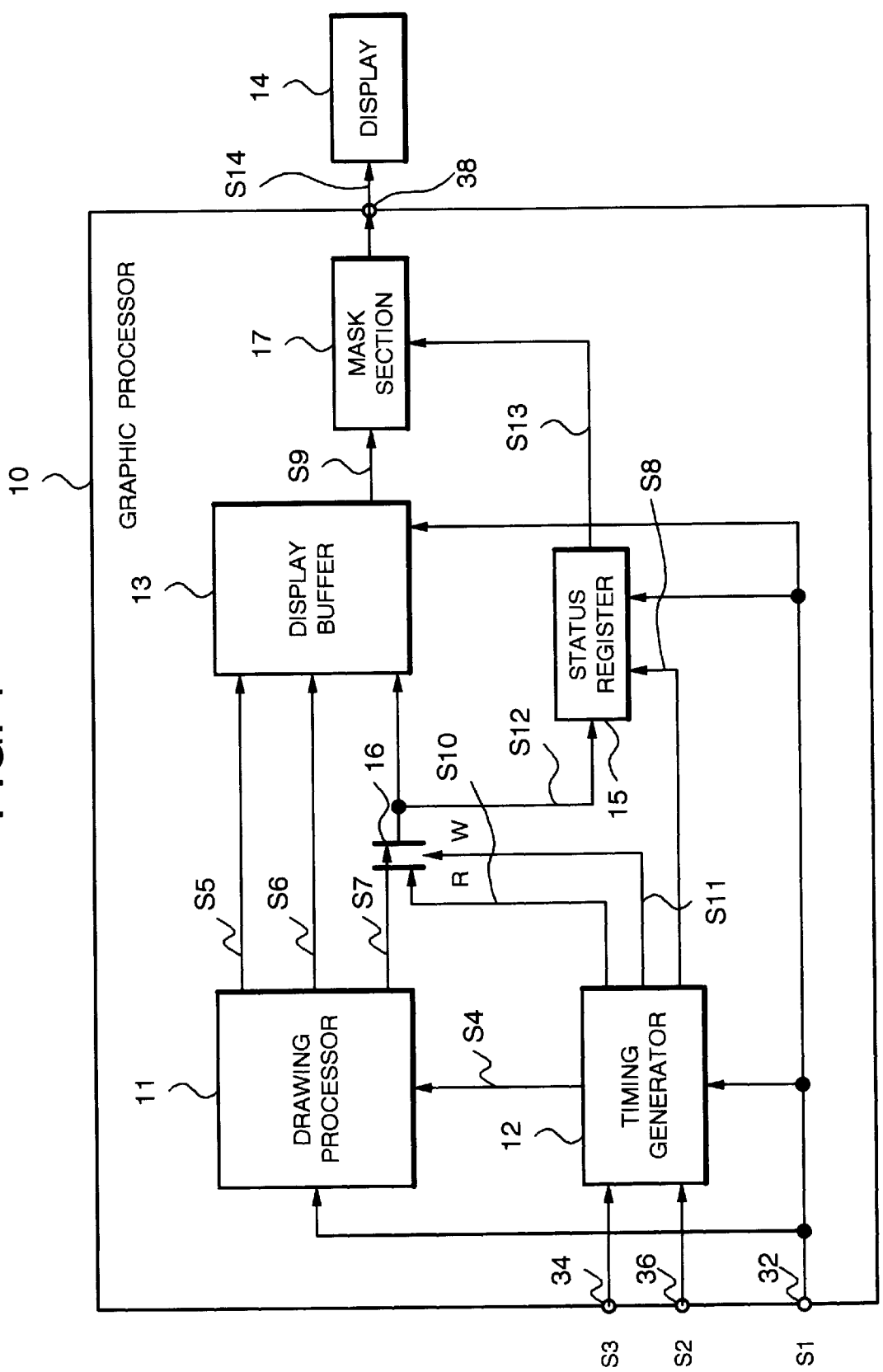
FIG. 1 is a block diagram to show the configuration of a graphic processor according to an embodiment of the present invention.

FIG. 1 is a block diagram to show the configuration of a graphic processor and the signal flow according to an embodiment of the present invention. Referring to the figure, a graphic processor 10 according to this embodiment comprises a first input terminal 32 for input of the clock signal (S1), a second input terminal 34 for input of the vertical sync signal (S2), a third input terminal 36 for input of the horizontal sync signal (S3), a drawing processor 11, a timing generator 12, a display buffer 13, a status register 15, a selection section 16, a mask section 17, an output terminal 38 and a display 24. Note that FIG. 1 shows the configuration characterizing this embodiment only and other general configuration is omitted here.

The graphic processor according to this embodiment is achieved by controlling a CPU incorporated in personal computers, game machines or other computer systems by means of a computer program. Such a computer program is provided in a form stored in magnetic disks, semiconductor memories or other general storage media and executes its function as described in this embodiment when loaded to the controller of the computer systems.

The timing generator 12 has input of the clock signal (S1), the vertical sync signal (S2) and the horizontal sync signal (S3) and outputs the drawing processor control signal (S4), the display initialize signal (S8), the display address signal (S10) and the drawing display switching signal (S11).

The drawing processor 11 is provided with a storage (Graphic ROM) to store the original data of the displayed figures and serves as a unit to output the graphic data. The clock signal (S1) and the drawing processor control signal (S4) are input to the drawing processor 11, which executes the predetermined drawing processing, generates the drawing graphic data signal (S5), the display buffer write enable signal (S6) and the display buffer drawing address signal (S7) and outputs them as graphic data.

To the selection section 16, the display buffer drawing address signal (S7), the display address signal (S10) and the drawing display switching signal (S11) are input. The selection section 16 selects the display buffer drawing address signal (S7) to be output as the display buffer address signal (S12) when the drawing display switching signal (S11) is "0" (L) and selects the display address signal to be output as the display buffer address signal (S12) when the drawing display switching signal (S11) is "1" (H).

The display buffer 13 has input of the clock signal (S1), the drawing graphic data signal (S5), the display buffer write enable signal (S6) and the display buffer address signal (S12) and outputs the display data signal (S9).

The status register 15 has the clock signal (S1), the display initialize signal (S8), and the display buffer address signal (S12) input and outputs the mask signal (S13).

The mask section 17 outputs the transparent data obtained by masking the display data signal (S9) as the post-masking display data signal to the display 24 when the mask signal (S13) is "0" (L) and outputs the display data signal (S9) without any change as the post-masking display data signal (S14) to the display 24 when the mask signal (S13) is "1" (H).

Figure 2:
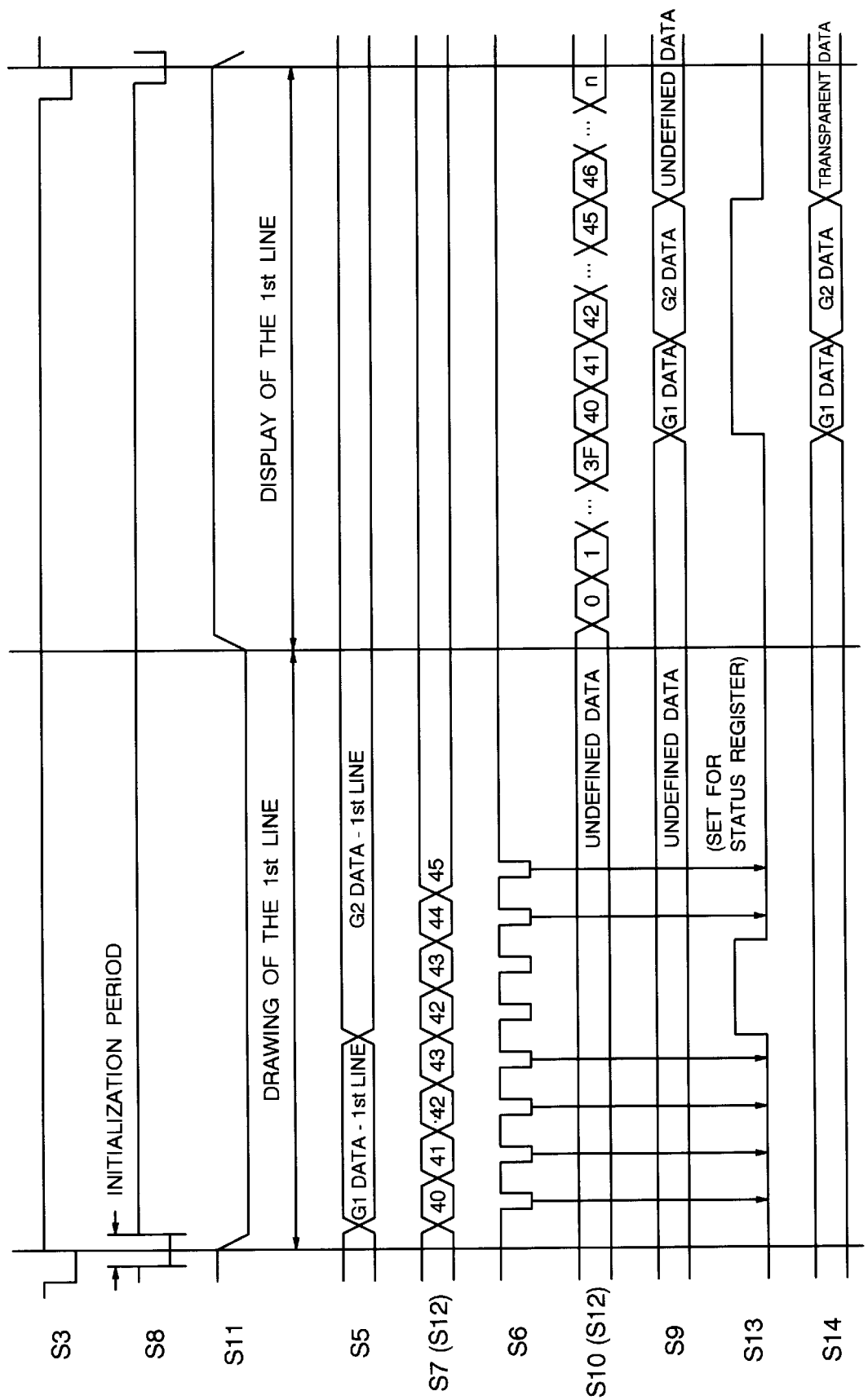
FIG. 2 is a time chart to show the signal waveforms corresponding to the graphic display operation for a frame in this embodiment.
Figure 3:
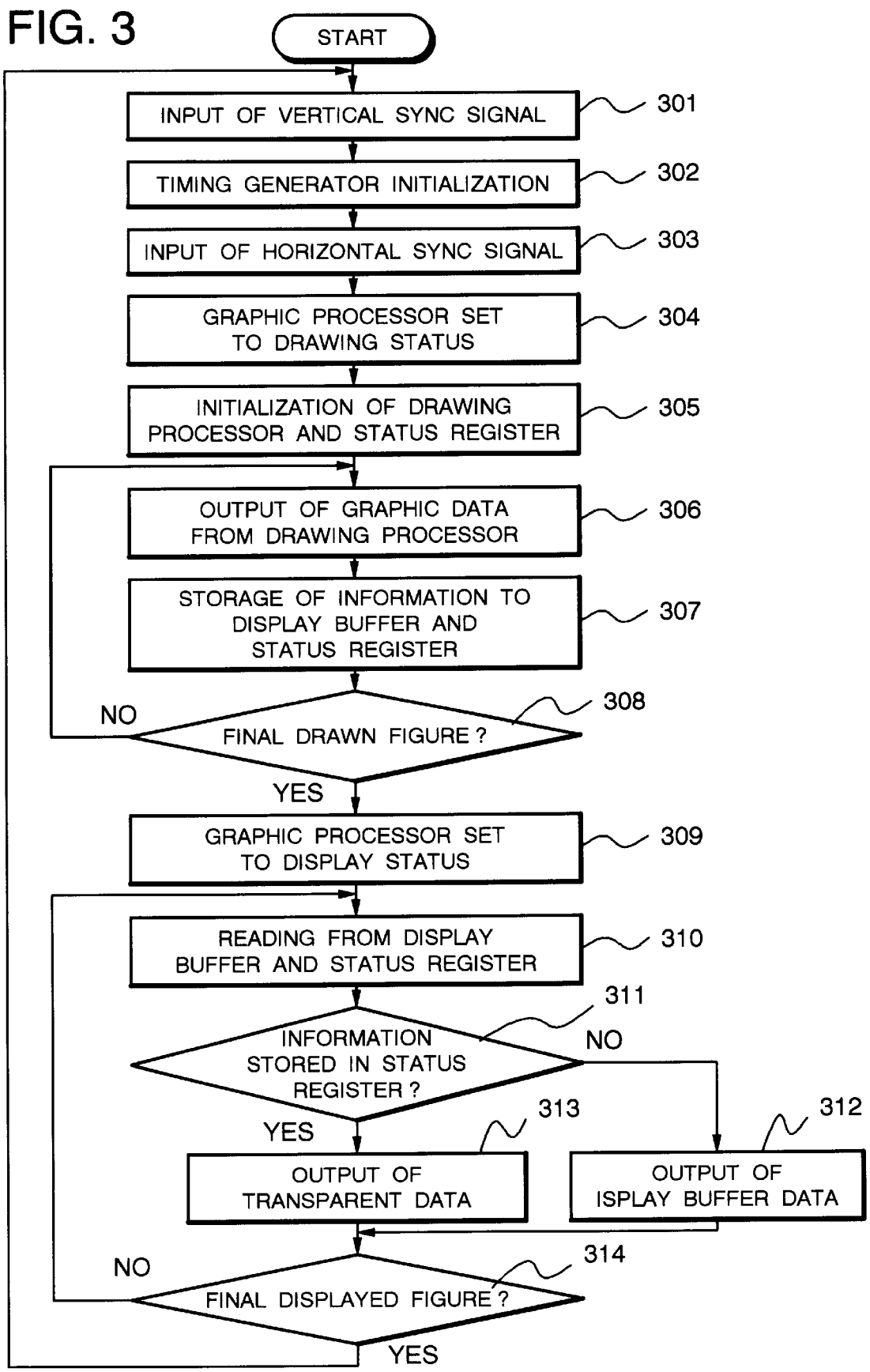
FIG. 3 is a flowchart to illustrate the operation of this embodiment.
Figure 4:
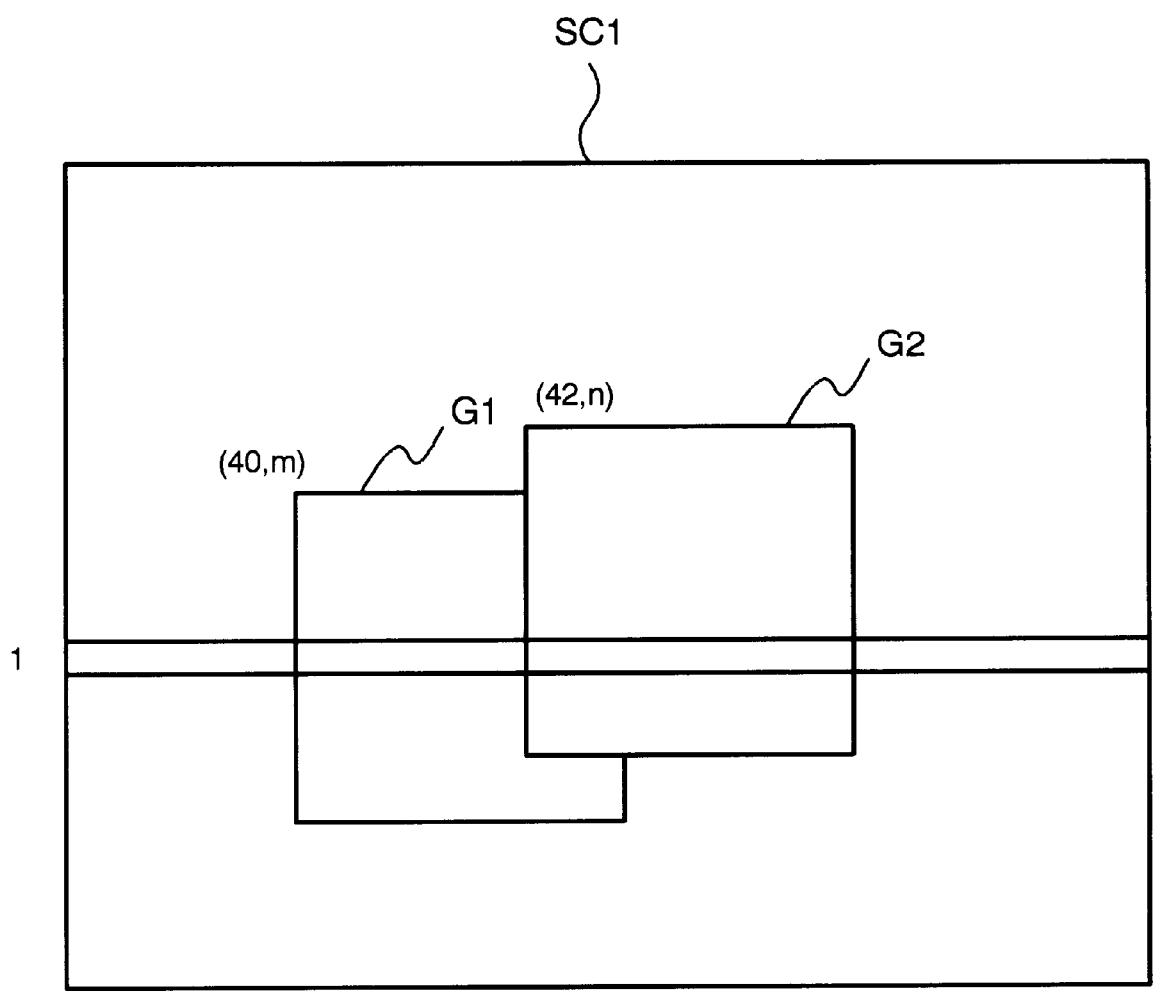
FIG. 4 is an explanatory view to show a model of graphic display example by stereographic display.
Figure 5:
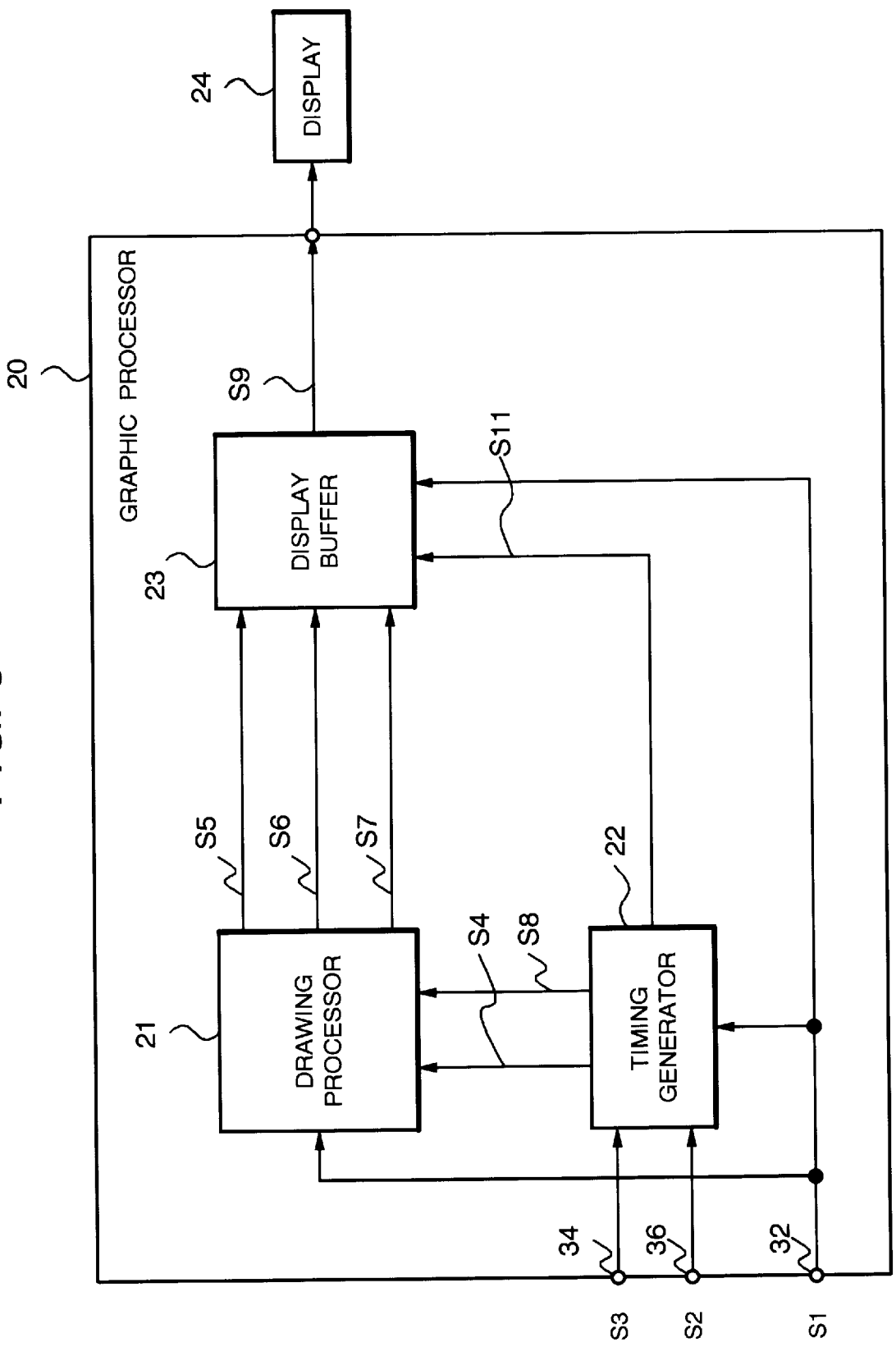
FIG. 5 is a block diagram to show the configuration of a conventional graphic processor.
Figure 6:
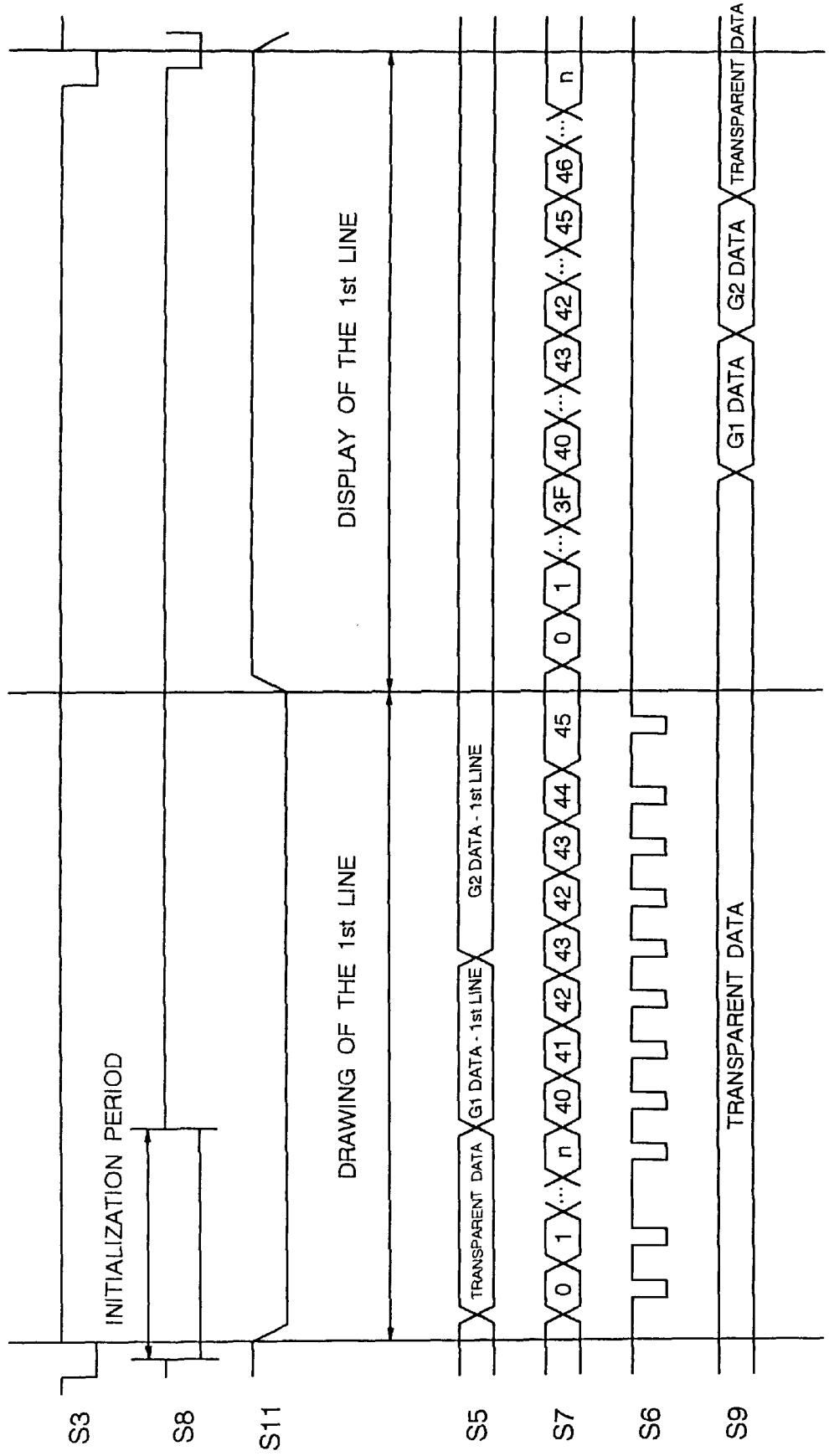
FIG. 6 is a time chart to show the signal waveforms corresponding to the graphic display operation for a frame in the graphic processor shown in FIG. 5.

Referring now to FIGS. 2 and 3, the operation of the graphic processor 10 when displaying the first line in FIG. 4 is described. FIG. 2 is a timing chart of the signal waveforms when the figures in FIG. 4 are displayed and FIG. 3 is a flowchart to show the processing procedure for display of the figures in FIG. 4.

Firstly, the vertical sync signal (S2) is input from the main system (not shown) to the graphic processor 10 (Step 301 of FIG. 3), and the timing generator 12 is initialized (Step 302). Then, to update the screen, the horizontal sync signal (S3) is once input from the main system (not shown) to the timing generator 12 (Step 303).

Upon input of the horizontal sync signal (S3), the graphic processor 10 gets ready for acceptance of drawing data (drawing status) (Step 304), and the timing generator 12 outputs the drawing processor control signal (S4), the display initialize signal (S8) and the drawing display switching signal (S11). At that time, the drawing display switching signal (S11) becomes "0" (L). The display initialize signal (S8) initializes the drawing processor 11 and the status register 15 (Step 305).

Figure 8:
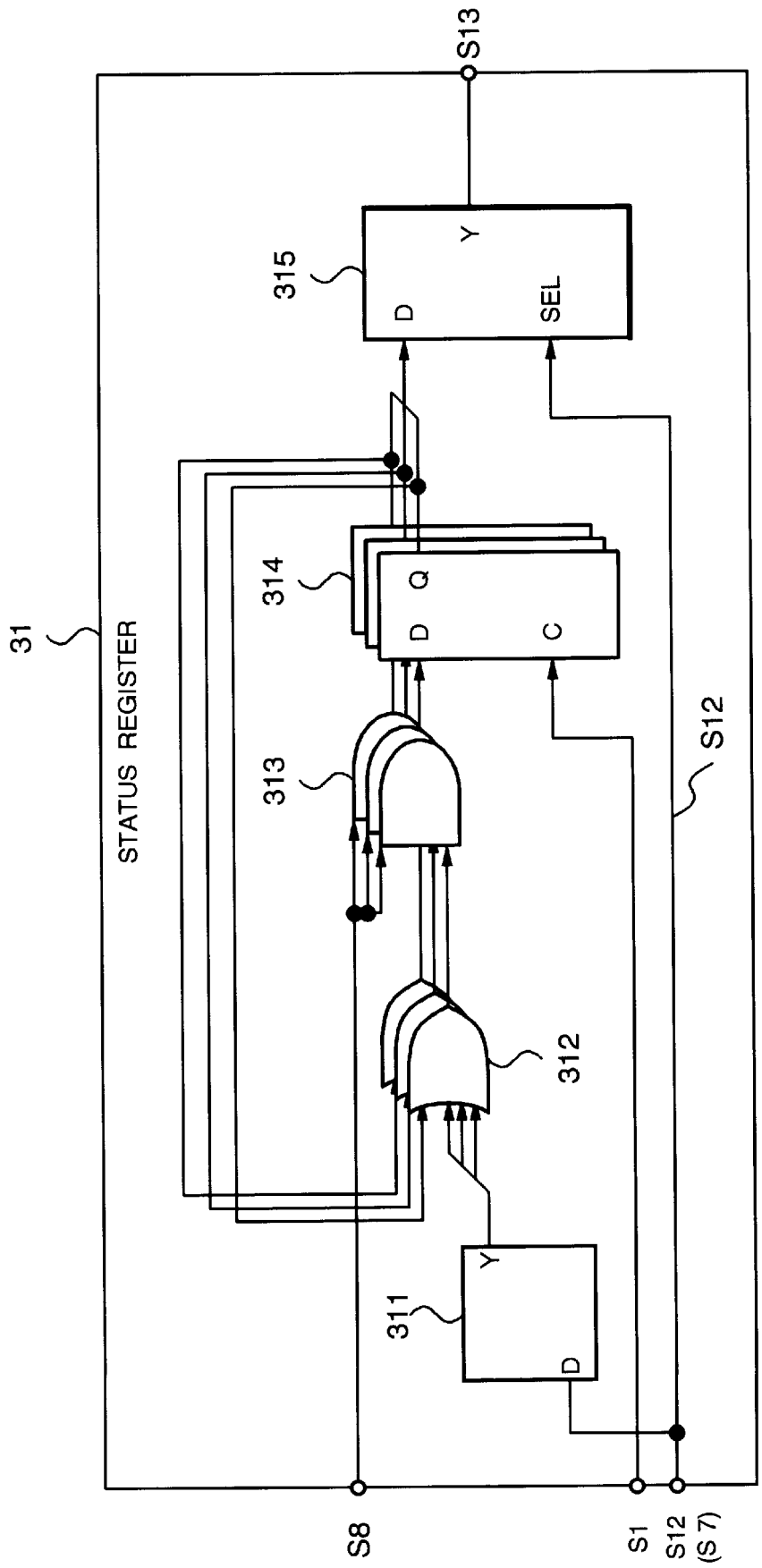
FIG. 8 is a block diagram to show the configuration of a status register.
Figure 9:
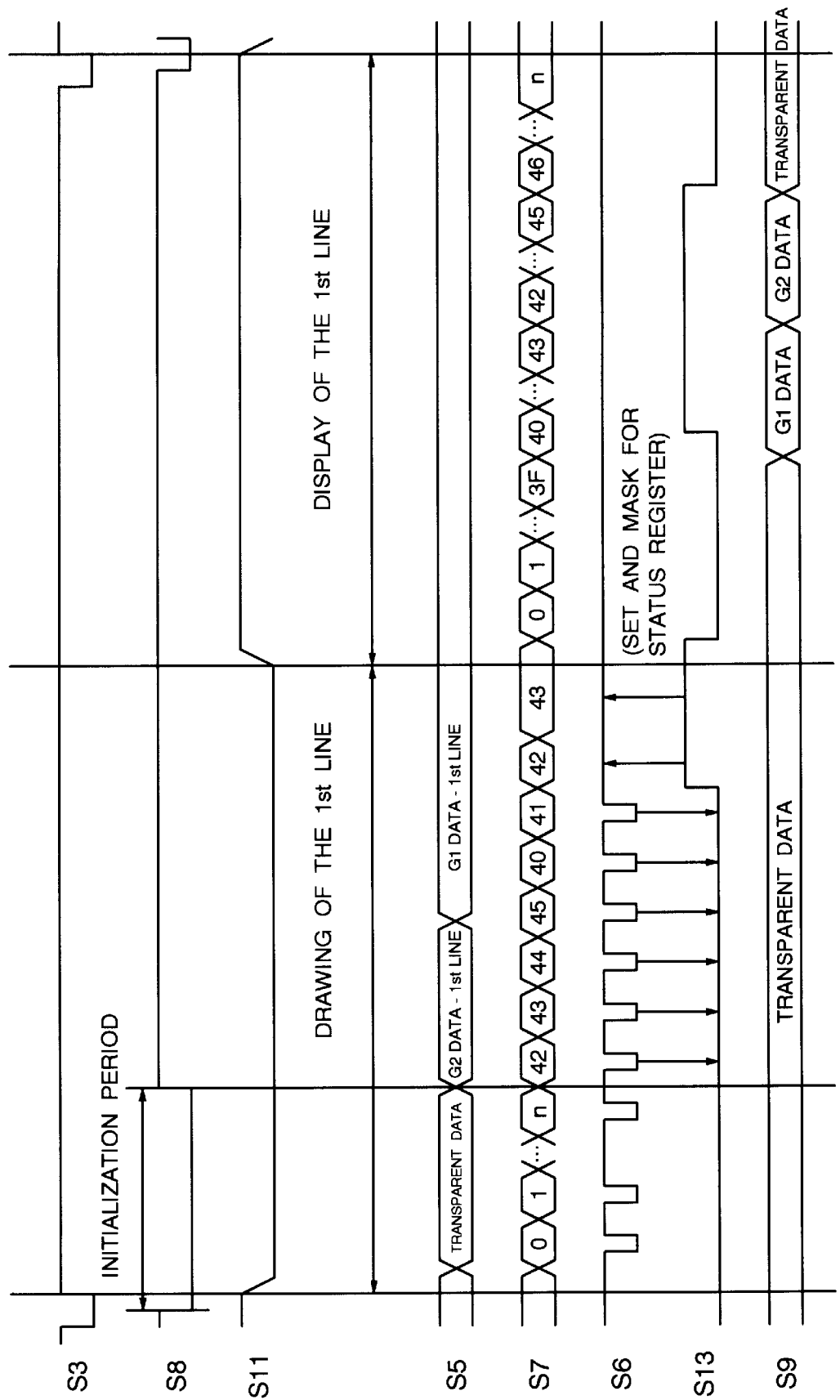
FIG. 9 is a time chart to show the signal waveforms corresponding to the graphic display operation for a frame in the graphic processor as shown in FIG. 7.
Figure 10:
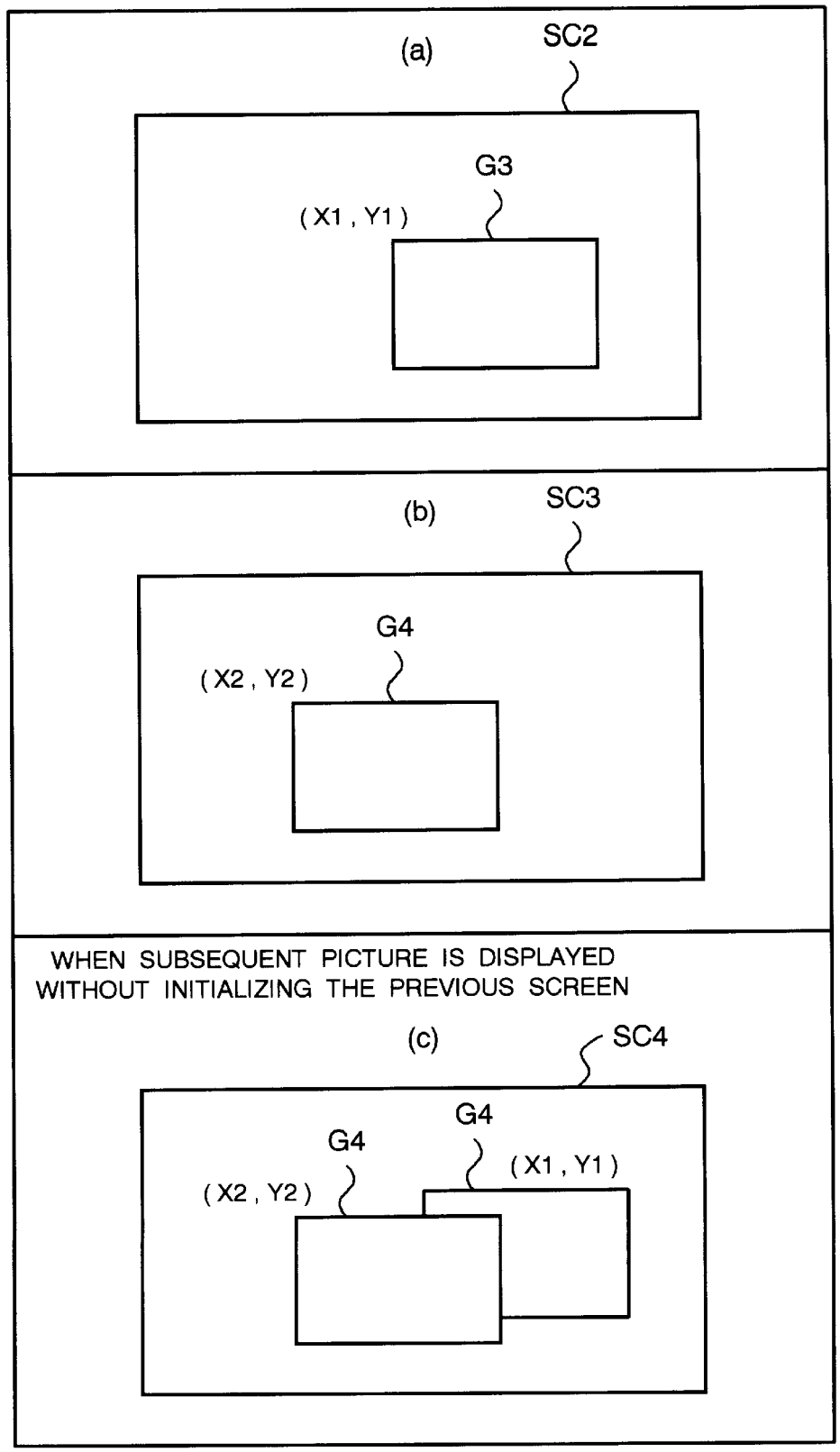
FIG. 10 is an explanatory view to illustrate the relation between update of a displayed picture and display initialization.

The status register 15 has the configuration similar to the status register 31 in a conventional graphic processor as shown in FIG. 8. The register 314 for every address is reset ("0" (L) signal is input) during initialization, and the register 314 corresponding to the arbitrary accessed address is set ("1" (H) signal is input) in processing other than initialization.

In this embodiment, initialization of the graphic processor 10 is executed while the display initialize signal (S8) is "0" (L) as shown in FIG. 2, and the drawing processor 11 and the status register 15 alone are initialized. Since it is not necessary to initialize the display buffer 13, the time required for display initialization is very short. It is, for example, about a clock as shown in FIG. 2. After this, initialization is completed when the display initialize signal (S8) becomes "1" (H) and the graphic processor 10 enters the drawing start status.

To display the figure G1 with a low priority in the picture shown in FIG. 4, the drawing processor 11 serially outputs, as the graphic data, the display buffer write enable signal (S6), the display buffer drawing address signal (S7)="40" to "43" (h) and the corresponding drawing graphic data signal (S5) for every clock signal (S1) (Step 306). Since the drawing display switching signal (S11) is "0" (L), the selection section 16 outputs the display buffer drawing address signal (S7) without any change as the display buffer address signal (S12)="40" to "43" (h). While the display buffer address signal (S12) is output, the display buffer write enable signal (S6) is kept at "0" (L).

The status register 15 has its internal status set so that it outputs "1" (H) upon input of the display buffer drawing address signal (S7)="40" to "43" (h). Therefore, while it accepts the display buffer address signal (S12)="40" to "43" (h), it outputs the mask signal (S13)="0" (L). The drawing processor 11 outputs, as the graphic data for the figure G1, the display buffer write enable signal (S6), the display buffer drawing address signal (S7)="40" to "43" (h) and the corresponding drawing graphic data signal (S5) and store them to the display buffer 13 (Step 307).

Then, to display the figure G2 as shown in FIG. 4, the drawing processor 11 serially outputs as graphic data the display buffer write enable signal (S6), the display buffer drawing address signal (S7)="42" to "45" (h) and the drawing graphic data signal (S5) for every clock signal (S1). At this time, since the drawing display switching signal (S11) is "0" (L), the selection section 16 outputs the display buffer drawing address signal (S7) without any change as the display buffer address signal (S12). While the display buffer address signal (S12) is output, the display buffer write enable signal (S6) is kept at "0" (L).

The status register 15 has its internal status set so that it outputs, upon input of the display buffer address signal (S12)="42" to "45", the mask signal (S13)="1" (H) in response and, upon input of the display buffer address signal (S12)="44" to "45" (h), outputs the mask signal (S13)="0" (L) in response. Therefore, upon receipt of the display buffer address signal (S12)="42" to "45" (h), the status register 15 outputs the mask signal (S13)="1" (H) while the display buffer address signal (S12)="42" to "43" (h) and outputs the mask signal (S13)="0" (L) while the display buffer address signal (S12)="44" to "45" (h).

By the operation above, the display buffer write enable signal (S6), the display buffer drawing address signal (S7)= "42" to "45" (h) and the drawing graphic data signal (S5) are stored to the display buffer 13 as the graphic data for the figure G2.

Upon completion of operation to store the graphic data for the final drawn figure (Figure G1, for example) to the display buffer 13, the drawing display switching signal (S11) becomes "1" (H) and the graphic processor 10 moves to the display status (Steps 308 and 309).

Upon receipt of the drawing display switching signal (S11)="1" (H), the selection section 16 selects the display address signal (S10) output from the timing generator 12 and provides it as the display buffer address signal (S12) for "0"

to "n" to the display buffer 13. This causes the corresponding display data to be taken out of the display buffer 13 (Step 310).

Next, it is checked whether information is stored in the status register 15 (Step 310). Specifically, the display buffer address signal (S12) is sent to the status register 15 and, according to this signal, the mask signal (S13)="1" (H) is provided for the period from "40" to "45" having the address information and the mask signal (S13)="0" is provided for other period to the mask section 17.

The mask section 17 outputs, as the post-masking display data signal to the display 14, the transparent data instead of the display data signal (S9) taken out of the display buffer 13 when the mask signal (S13) is "0" (L) (Step 312). When the mask signal (S13) is "1" (H), it outputs the display data signal (S9) without any change as the post-masking display data signal (S14) to the display 14.

The above processes are repeated until the graphic data of the final displayed figure is output for a single display screen. Thus, figures G1 and G2 as shown in FIG. 4 are drawn.

As described above, according to this embodiment, the status register 15 is initialized instead of the display buffer 13 and they are set so that the display buffer 13 has the same addresses as the status register 15 in the drawing process. Whether or not to convert the graphic data output from the display buffer 13 to transparent data is controlled according to the mask signal output from the status register 15 when a figure is displayed. Thus, the time required for display initialization can be largely reduced—to about 1 or 2 clock, for example.

The present invention enables the user to use much of the time conventionally consumed for display initialization for graphic processing and graphic display and many figures can be processed and displayed. For example, supposing that the display initialize time and graphic processing time of a conventional graphic processor to be [a] and [b], the amount of figures which can be processed can be increased by [a]/[b].

Figure 7:
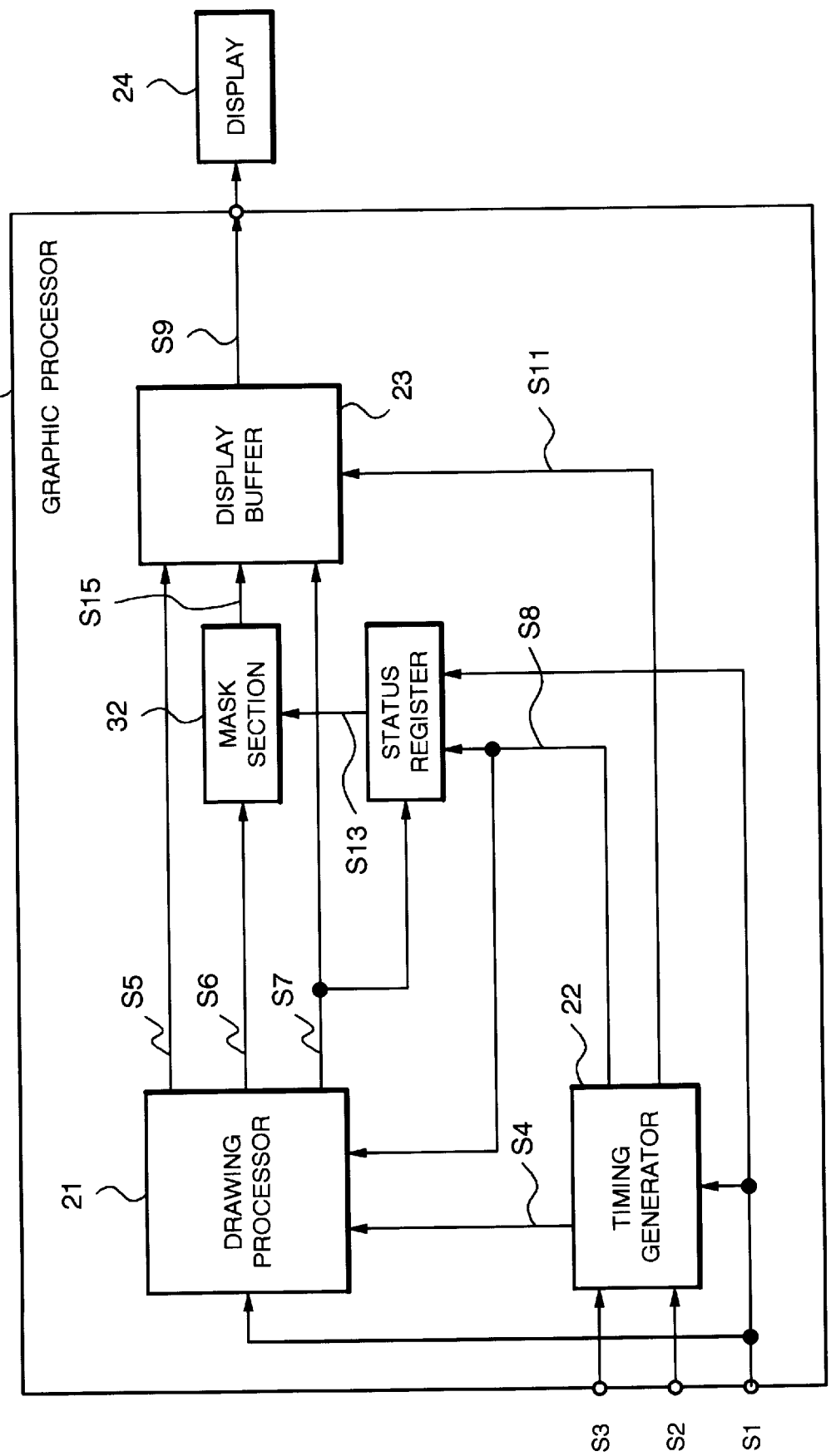
FIG. 7 is a block diagram to show the configuration of another conventional graphic processor.

Though, in this embodiment, display data are stored to the display buffer 13 in the order starting from a figure with a lower display priority, this invention is naturally applicable to a method storing the display data to the display buffer 13 starting from a figure with a higher display priority as in the graphic processor 30 in FIG. 7, which has been explained as the prior art.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A graphic processor for drawing several overlaid graphic data having a positional relation in a third depth dimension on a single two dimensional display screen of a display unit, comprising:

timing generation means for outputting a drawing processing control signal, a display initialize signal, a display address signal and a drawing display switching signal for control of operation timing according to a clock signal, a vertical sync signal and a horizontal sync signal;

drawing processing means which incorporates a for storage storing original data of displayed figures and, under the control of said clock signal and said drawing processing control signal, for outputting a drawing graphic data signal, a display buffer write enable signal and a display buffer drawing address signal of object figures as graphic data;

selection means, under the control of said drawing display switching signal output from said timing generation means, for selecting either said display buffer drawing address signal output from said drawing processing means or said display address signal output from said timing generation means and outputting the selected signal as a display buffer address signal;

display buffer means for inputting said clock signal, said drawing graphic data signal and said display buffer write enable signal and said display buffer address signal and, according to said clock signal and said display buffer address signal, outputting the display data signal;

status register means for inputting said clock signal, said display initialize signal and said display buffer address signal and, being reset under control of said display initialize signal and outputting a mask signal corresponding to said display buffer address signal; and mask means for inputting said display data signal and said mask signal output from said status register means and, under the control of said mask signal, outputting a post-masking display data signal with providing necessary masks to said display data signal to said display unit.

2. A graphic processor as set forth in claim 1, wherein said status register means outputs said mask signal having two values, and said mask means outputs as the post-masking display data signal the graphic data to display the same color as the background of the screen obtained by masking said display data signal when one of said two values of the mask signal is input and outputs as the post-masking display data signal said display data signal without any change when the other one of said two values of the mask signal is input.

3. A graphic processor as set forth in claim 1, wherein said display buffer means without being initialized receives input of said drawing graphic data signal and said display buffer write enable signal and said display buffer address signal for a display picture after update and outputs said display data signal in the process to update a display picture to be displayed on said display unit, and said mask means is controlled by said mask signal and masks said display data signal corresponding to the position where no figure is to be displayed in the picture after said update.

4. A graphic processor as set forth in claim 1, wherein said display buffer means without being initialized receives input of said drawing graphic data signal, said display buffer write enable signal and said display buffer address signal for the picture after update and outputs said display data signal in the process to update a display picture to be displayed on said display unit, said status register means outputs said mask signal which has two values so that one of them corresponds to a position where no figure is to be displayed in a display picture after said update and the other corresponds to a position where a figure is displayed in a display picture after said update, and said mask means outputs as the post-masking display data signal the graphic data to display the same color as the background of the screen obtained by masking said display data signal when said one of the values of said mask signal is input and outputs as the post-masking display data signal said display data signal without any change when the other value of said mask signal is input.

5. A graphic processing method to draw a plurality of graphic data having a positional relation in a third death dimension on a single two dimensional display screen of a display unit with overlaying a plurality of graphic data, comprising the steps of:

a step of outputting a drawing graphic data signal, a display buffer write enable signal and a display buffer drawing address signal of object figures as a graphic data from a drawing processing means incorporating a storage for storing original data of displayed figures;

a step of storing said drawing graphic data signal, said display buffer write enable signal and said display buffer drawing address signal to a display buffer means;

a step of selecting either said display buffer drawing address signal output from said drawing processing means or the display address signal output from a timing generation means according to the drawing display switching signal output from the timing generation means for operation timing control;

a step of storing a selected signal as a display buffer address signal to a status register means;

a step of reading display data from said display buffer means, and outputting either said display data without any change or said display data with masking for conversion to the graphic data to display the same color as screen background color according to information stored in said status register means, after the output of the graphic data from said drawing processing means for a figure to be finally displayed on said display unit.

6. A graphic processing method as set forth in claim 5, further comprising a step of inputting a vertical sync signal for initialization of said timing generation means before output of said graphic data from said drawing processing means, and a step of inputting a horizontal sync signal and initializing said drawing processing means and said status register means after initialization of said timing generation means.

7. A computer readable memory storing a control program for controlling a graphic processor to draw several overlaid graphic data with positional relation in a third depth dimension on a single two dimensional display screen of a display unit, said control program comprising the steps of:

a step of outputting a drawing graphic data signal, a display buffer write enable signal and a display buffer drawing address signal of object figures as graphic data from a drawing processing means incorporating a storage for storing original data of displaying figures;

a step of storing said drawing graphic data signal, said display buffer write enable signal and said display buffer drawing address signal to a display buffer means;

a step of selecting either said display buffer drawing address signal output from said drawing processing means or the display address signal output from a timing generation means according to a drawing display switching signal output from the timing generation means for operation timing control;

a step of storing a selected signal as a display buffer address signal to a status register means;

a step of reading display data from said display buffer means, and outputting either said display data without any change or said display data with masking for conversion to the graphic data to display the same color as screen background color according to information stored in said status register means, after the output of the graphic data from said drawing processing means for a display figure to be finally displayed on said display unit.

8. A storage medium as set forth in claim 7 wherein a step of inputting a vertical sync signal for initialization of said timing generation means before output of said graphic data from said drawing processing means, and a step of inputting a horizontal sync signal and initializing said drawing processing means and said status register means after initialization of said timing generation means.

* * * * *